(12) United States Patent
Seki

(10) Patent No.: US 8,052,288 B2
(45) Date of Patent: Nov. 8, 2011

(54) PROJECTOR

(75) Inventor: Shigeyuki Seki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 289 days.

(21) Appl. No.: 12/482,631

(22) Filed: Jun. 11, 2009

(65) Prior Publication Data

US 2009/0310092 A1 Dec. 17, 2009

(30) Foreign Application Priority Data

Jun. 17, 2008 (JP) ................................ 2008-157880

(51) Int. Cl.
*G03B 21/14* (2006.01)
*G03B 21/28* (2006.01)

(52) U.S. Cl. ......................................... 353/119; 353/98
(58) Field of Classification Search .................. 353/22, 353/78, 98, 99, 119
See application file for complete search history.

(56) References Cited

U.S. PATENT DOCUMENTS

| | | | | |
|---|---|---|---|---|
| 6,652,104 B2 * | 11/2003 | Nishida et al. | ................... | 353/70 |
| 7,470,030 B2 * | 12/2008 | Devos et al. | ................... | 353/74 |
| 7,638,620 B2 * | 12/2009 | LaCasse et al. | ............... | 536/24.5 |
| 7,771,057 B2 * | 8/2010 | Combs et al. | ................. | 353/119 |
| 2003/0197840 A1 * | 10/2003 | Shiraishi et al. | .............. | 353/119 |
| 2007/0146649 A1 * | 6/2007 | Daniel et al. | ..................... | 353/99 |
| 2007/0206163 A1 * | 9/2007 | Kuroda | ............................. | 353/88 |
| 2008/0218707 A1 * | 9/2008 | Adachi et al. | ................... | 353/98 |
| 2010/0165308 A1 * | 7/2010 | Morikuni et al. | ............... | 353/98 |

FOREIGN PATENT DOCUMENTS

| | | |
|---|---|---|
| JP | 05-065549 U | 8/1993 |
| JP | 09-139582 A | 5/1997 |
| JP | 10-73884 A | 3/1998 |
| JP | 2002-55306 A | 2/2002 |
| JP | 2004-12749 A | 1/2004 |
| JP | 2005-316250 A | 11/2005 |
| JP | 2007-334052 A | 12/2007 |
| JP | 2008-070694 A | 3/2008 |
| JP | 2008-107801 A | 5/2008 |
| JP | 2008-165202 A | 7/2008 |
| WO | WO2006-058884 A | 6/2006 |

OTHER PUBLICATIONS

Hitachi, Ltd, "Projector CP-A100 User's Manual (detailed) Operating Guide", Chapter 1, pp. 1-75, Japan.

* cited by examiner

*Primary Examiner* — William C Dowling
(74) *Attorney, Agent, or Firm* — AdvantEdge Law Group, LLC

(57) ABSTRACT

A projector includes: a light source device; an optical modulation device; a projection optical device; and an exterior casing, wherein a luminous flux passage opening for allowing the image light projected magnified from the projection optical device to pass through is formed in a first surface of the exterior casing, the projection optical device includes an aspheric mirror which reflects the image light to the first surface side, and magnifies and projects the image light via the luminous flux passage opening, and the exterior casing is provided with a transmissive member which closes the luminous flux passage opening; and a cover which, being movably attached to the first surface, moves between a closed position in which the transmissive member is covered and an open position in which the transmissive member is exposed.

6 Claims, 11 Drawing Sheets

PROJECTOR

CROSS REFERENCE TO RELATED APPLICATIONS

The present application claims priority from Japanese Patent Application No. 2008-157880 filed on Jun. 17, 2008, which is hereby incorporated by reference in its entirety.

BACKGROUND

1. Technical Field

The present invention relates to a projector.

2. Related Art

To date, as a front projection type projector, a configuration has been known which employs a short focus projection optical device in which a projection distance is shortened in order to improve the degree of freedom in installation of the projector (refer to JP-A-2007-334052).

2. Related Art

In a projector described in JP-A-2007-334052, a projection optical device includes, at the last stage of the optical path therein, an aspheric mirror having a reflecting surface which, being formed as a free-form surface, is not of rotational symmetry. Then, by an image light being reflected by the aspheric mirror, the angle of the image light is widened via a luminous flux passage opening provided in a first surface of an exterior casing. By means of this kind of configuration, it is possible to install the projector in a position close to a wall surface on which a screen is installed, improving the degree of freedom in installation of the projector.

However, with the projector described in JP-A-2007-334052, as the aspheric mirror is in a condition in which it is exposed via the luminous flux passage opening, there is a problem in that it is difficult to efficiently maintain a projection image in a clear condition, due to dust adhesion to the aspheric mirror, contamination of the aspheric mirror caused by handling it, or an impact on the aspheric mirror caused by handling it or the like.

SUMMARY

An advantage of some aspects of the invention is to provide a projector which can efficiently maintain a projection image in a clear condition.

A projector according to an aspect of the invention includes a light source device; an optical modulation device which modulates a luminous flux emitted from the light source device in accordance with image information, forming an image light; a projection optical device which magnifies and projects the image light; and an exterior casing which configures an exterior. A luminous flux passage opening for allowing the image light projected magnified from the projection optical device to pass through is formed in a first surface of the exterior casing. The projection optical device includes an aspheric mirror which reflects the image light to the first surface side, and magnifies and projects the image light via the luminous flux passage opening. The exterior casing is provided with a transmissive member which closes the luminous flux passage opening, and a cover which, being movably attached to the first surface, moves between a closed position in which the transmissive member is covered and an open position in which the transmissive member is exposed.

In the aspect of the invention, as the transmissive member is attached to the first surface of the exterior casing, it is possible to close the luminous flux passage opening by means of the transmissive member while allowing the image light reflected by the aspheric mirror to pass through the luminous flux passage opening. For this reason, it being possible to avoid dust adhesion to, contamination of, or an impact on, the aspheric mirror, it is possible to efficiently maintain a projection image in a clear condition.

Also, as the cover is attached to the first surface, by positioning the cover in the open position, it is possible to cover the transmissive member with the cover when the projector is not used. That is, as it is possible to avoid dust adhesion to, contamination of, or an impact on, the transmissive member by means of the cover, it is possible to protect the aspheric mirror by means of the transmissive member, as well as efficiently maintaining a projection image in a clear condition.

In the projector according to the aspect of the invention, it is preferable that the transmissive member is disposed tilted upward from an image light projection side toward a side opposite to the projection side.

Meanwhile, for example, in the event that the transmissive member is disposed in such a way as to be parallel to the horizontal, the angle of incidence of the image light reflected by the aspheric mirror onto the transmissive member becomes large. In particular, an angle of incidence of the image light on the outer periphery of the transmissive member becomes larger. In this way, in the event that the angle of incidence of the image light on the transmissive member is large, an effect of refraction in the transmissive member causes a projection image distortion and an image degradation.

In the aspect of the invention, when the projector is placed on a desk or the like, the transmissive member is disposed tilted in such a way that a height position thereof on the projection side (hereafter the front side) is lower than a height position thereof on the side opposite to the projection side (hereafter the rear side). That is, the transmissive member is disposed tilted from the horizontal in such a way as to face the reflecting surface of the aspheric mirror. By this means, it being possible to reduce the angle of incidence of the image light on the transmissive member in comparison with the case in which the transmissive member is disposed in such a way as to be parallel to the horizontal, it is possible to suppress the effect of refraction in the transmissive member. For this reason, it is possible to suppress the projection image distortion and image degradation, efficiently maintaining a projection image in a clear condition.

In the projector according to the aspect of the invention, it is preferable that a cover attachment portion to which the cover is attached is provided on the first surface, and the cover attachment portion includes a bulging surface portion which protrudes above a region of the first surface other than the cover attachment portion; a tilted surface portion which, being tilted upward from the projection side toward the side opposite to the projection side, connects an end of the bulging surface portion on the image light projection side and the other region; and connection portions which, standing from ends of the bulging surface portion and tilted surface portion parallel to a direction in which the image light is projected, are connected to the other region, wherein the luminous flux passage opening is formed in the tilted surface portion, and the cover, being movably attached to the connection portions, is positioned in the closed position by moving to the projection side, and positioned in the open position by moving to the side opposite to the projection side.

In the aspect of the invention, the cover attachment portion provided on the first surface includes the bulging surface portion, the tilted surface portion, and the connection portions. Then, the tilted surface portion, as well as being tilted in such a way that the height position thereof on the front side is lower than the height position thereof on the rear side when the projector is placed on a desk or the like, has the luminous flux passage opening formed therein. By this means, simply by bringing the transmissive member into abutment with the tilted surface portion, it is possible to dispose the transmissive member tilted, facilitating the installation of the transmissive member.

Also, as the luminous flux passage opening is formed in the tilted surface portion, the opening face is tilted from the horizontal in such a way as to face the reflecting surface of the aspheric mirror. For this reason, for example, it is possible to increase an apparent opening area of the luminous flux passage opening when seen from the aspheric mirror side, in comparison with a case in which the luminous flux passage opening is formed in such a way as to be parallel to the horizontal. Consequently, it not being necessary to form the luminous flux passage opening to be larger than necessary in order to allow the image light reflected by the aspheric mirror to pass therethrough, it is possible to make the external appearance of the projector pleasing.

Furthermore, the connection portions coming into engagement with the cover, standing from the bulging surface portion and the tilted surface portion, are connected to the region of the first surface other than the cover attachment portion. That is, the connection portions are formed on an inner side of the opening face of the luminous flux passage opening within the exterior casing. By this means, it being possible to prevent the image light reflected by the aspheric mirror and projected via the luminous flux passage opening from being blocked by the connection portions, it is possible to efficiently maintain a projection image.

In the projector according to the aspect of the invention, it is preferable that the cover includes a plate-like cover main body, and standing pieces which, standing from ends of the cover main body parallel to the direction in which the image light is projected, come into abutment with the connection portions, and that a first engagement pin and second engagement pin which protrude toward the connection portions are formed on the standing pieces, in this order from the projection side, and a first slot and second slot which, having the respective engagement pins inserted therein, guide a movement of the respective engagement pins are formed in the connection portions, wherein the first slot is tilted upward from an end position thereof on the projection side toward an end position thereof on the side opposite to the projection side, and the second slot is set so that the whole extent from an end position thereof on the projection side to an end position thereof on the side opposite to the projection side is parallel to the first surface.

In the aspect of the invention, the first engagement pin and second engagement pin, and the first slot and second slot, are employed as a structure of engagement of the cover with the cover attachment portion.

Then, when the projector is placed on a desk or the like, the first slot is set so that the height position of the front side end is lower than that of the rear side end. By this means, when the cover moves to the open position from the closed position, the first engagement pin is guided by the first slot, and the cover moves while the front side end thereof is being gradually pulled upward. For this reason, when the cover moves, the front side end thereof is prevented from interfering mechanically with the bulging surface portion, enabling an efficient movement of the cover with a simple configuration.

Also, the second slot is set so that the front side and rear side ends are identical in height position when the projector is placed on a desk or the like. By this means, it is possible to set the height position of the rear side end of the cover in a condition in which the cover is positioned in the closed position to be identical to that of the cover in a condition in which it is positioned in the open position. For this reason, for example, in the event of designing in such a way that a clearance between the rear side end of the cover and the cover attachment portion is minimized in the condition in which the cover is positioned in the closed position, it is also possible, in the condition in which the cover is positioned in the open position, to minimize the clearance between the rear side end of the cover and the cover attachment portion. Consequently, as the clearance between the rear side end of the cover and the cover attachment portion is minimized when the projector is used and when it is not used, it is possible to make the external appearance of the projector pleasing.

In the projector according to the aspect of the invention, it is preferable that the bulging surface portion and the tilted surface portion are formed to be flat, and the first slot is formed in a linear shape parallel to the tilted surface portion, while the second slot is formed in a linear shape parallel to the bulging surface portion.

In the aspect of the invention, as the first slot and the second slot are formed in the shapes heretofore described, it is possible to set the height position of the rear side end of the cover to be always constant when the cover moves when the projector is placed on a desk or the like. For this reason, it being possible, not only when the projector is used and when it is not used, but also in a condition in which the cover is positioned between the closed position and the open position, to minimize the clearance between the rear side end of the cover and the cover attachment portion, it is possible to make the external appearance of the projector more pleasing.

In the projector according to the aspect of the invention, it is preferable that the connection portions are each provided with a first biasing portion which, when at least one of the two engagement pins is positioned at the end of the slot on the projection side, biases the one engagement pin to the projection side, regulating a movement of the one engagement pin to the side opposite to the projection side; and a second biasing portion which, when the one engagement pin is positioned at the end of the slot on the side opposite to the projection side, biases the one engagement pin to the side opposite to the projection side, regulating a movement of the one engagement pin to the projection side.

In the aspect of the invention, the connection portions are each provided with the first biasing portion and the second biasing portion. By this means, in the condition in which the cover is positioned in the closed position, the engagement pin is biased to the front side by the first biasing portion, regulating a movement of the cover to the rear side. Also, in the condition in which the cover is positioned in the open position, the engagement pin is biased to the rear side by the second biasing portion, regulating a movement of the cover to the front side. For this reason, it is possible to prevent the cover from moving by itself. Also, by employing a configuration wherein the cover, when moved to the closed position or the open position, is minimally vibrated by the biasing portions, it being possible to make a user aware of a condition of movement of the cover, it is possible to reliably move the cover to the closed position or the open position. Consequently, it is possible to improve the usability of the projector.

In the projector according to the aspect of the invention, it is preferable that grooves extending parallel to the direction in which the image light is projected are formed in the first surface, and the connection portions configure side wall portions of the grooves.

In the aspect of the invention, the connection portions configure the side wall portions of the grooves formed in the first surface. By this means, as the cover comes into engagement with the connection portions in a condition in which one portion (the leading end portions of the standing pieces) of the cover is inserted in the grooves, it being possible to attain a condition in which the structure of engagement of the cover with the connection portions (the engagement pins and the slots) is invisible from the exterior, it is possible to improve the external appearance of the projector.

In the projector according to the aspect of the invention, it is preferable that the cover main body is formed bent in such a way as to follow the bulging surface portion and the tilted surface portion.

In the aspect of the invention, as the cover main body is formed in the way heretofore described, when the cover moves, the underside of the cover is prevented from interfering mechanically with the bulging surface portion, enabling an efficient movement of the cover.

Also, for example, in the condition in which the cover is positioned in the closed position, the front side region of the cover main body is formed in such a way as to be parallel to the tilted surface portion, while the rear side region of the cover main body is formed in such a way as to be parallel to the bulging surface portion. By forming in this way, as the cover attains a shape following the shape of the cover attachment portion when the projector is not used, it is possible to improve the external appearance of the projector.

Also, by forming in the way heretofore described, in the condition in which the cover is positioned in the open position, it also being possible to set a condition in which the front side region of the cover main body is made parallel to the bulging surface portion, it is possible, when the projector is used too, to improve the external appearance of the projector. Furthermore, at this time, the rear side region of the cover main body attains a condition in which it is tilted from the bulging surface portion and, by eliminating a step between the cover main body and the bulging surface portion, it is possible to further improve the external appearance of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
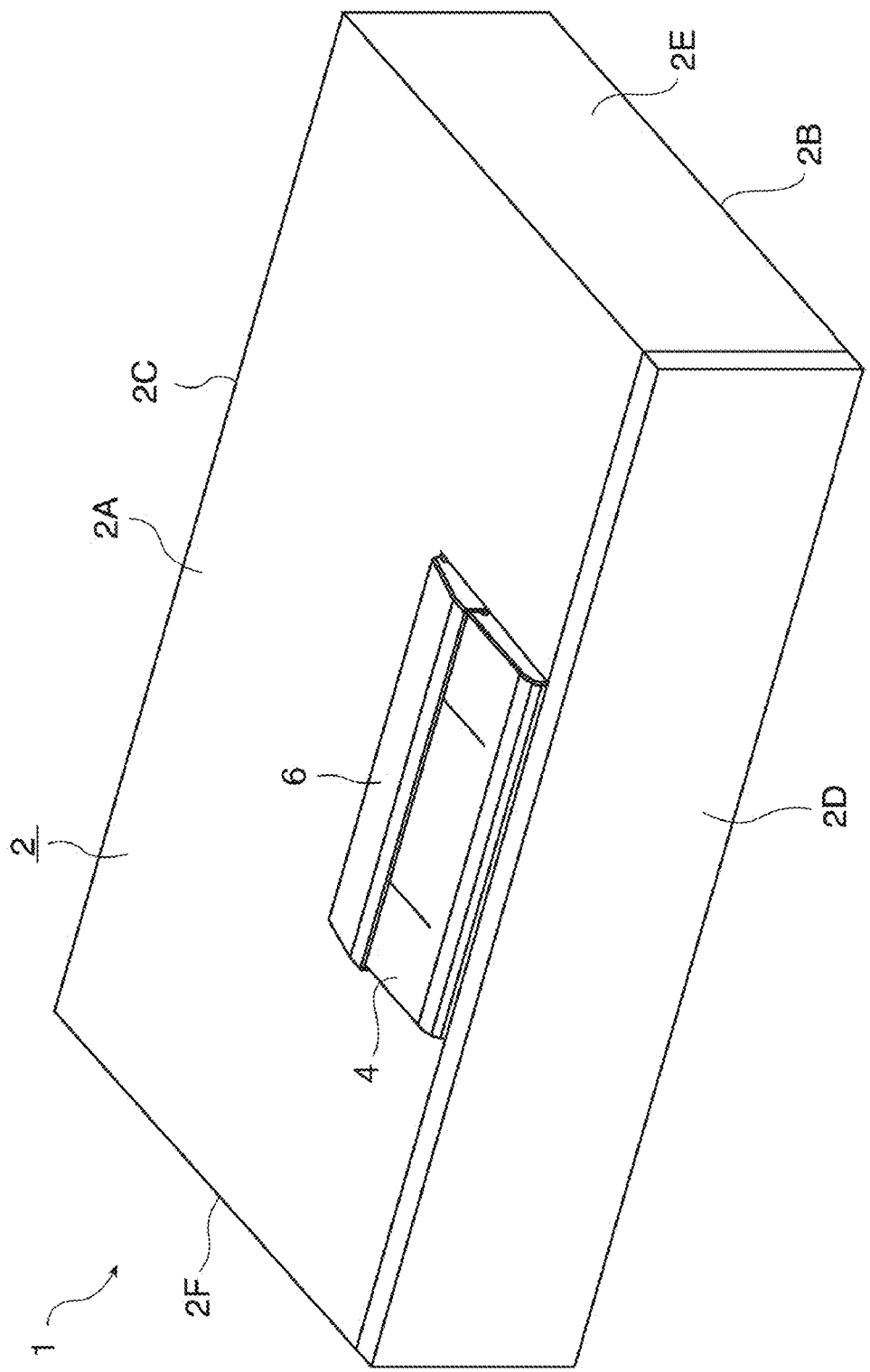
FIG. 1 schematically shows an outline configuration of a projector in an embodiment.
Figure 2:
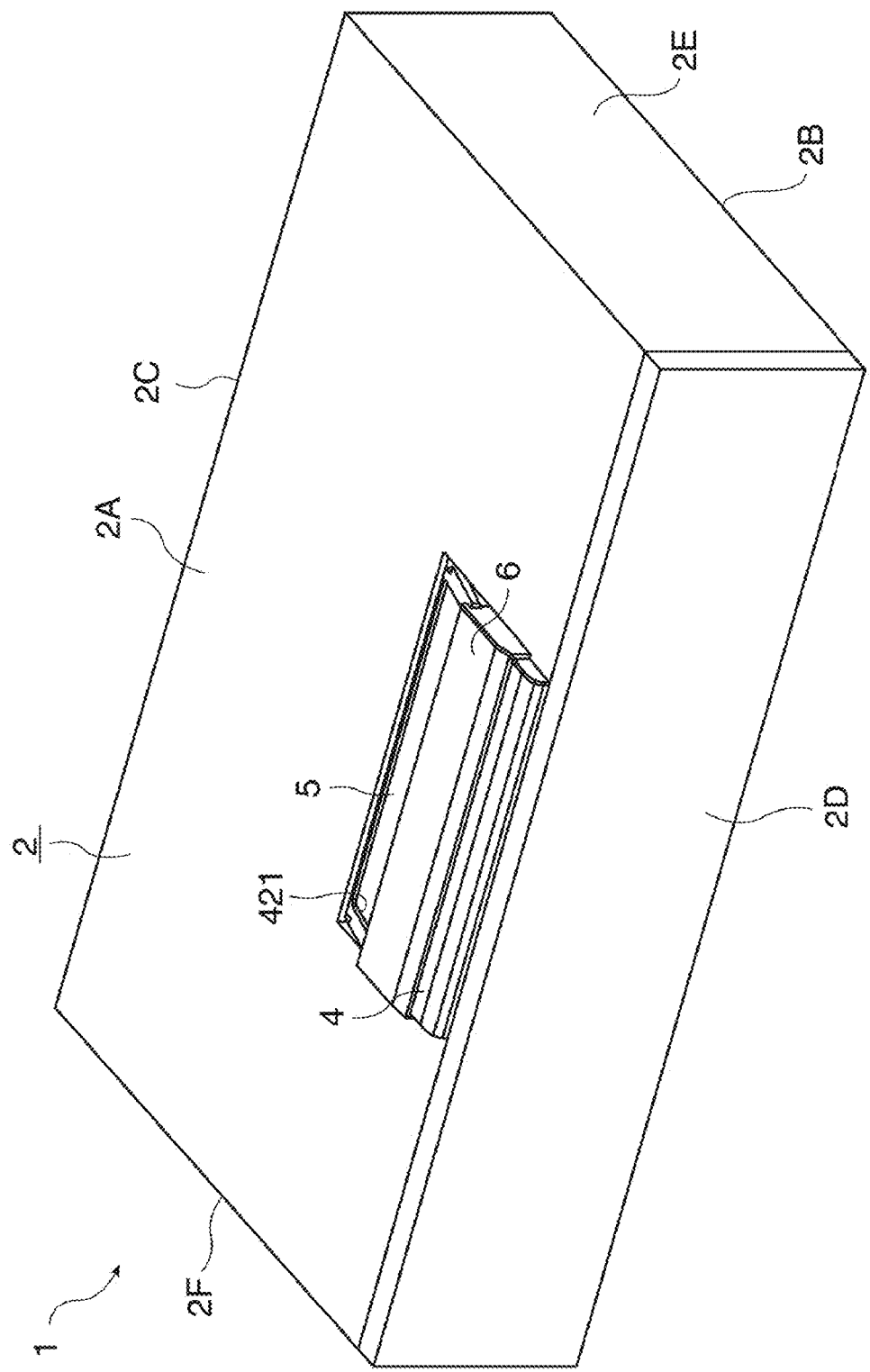
FIG. 2 schematically shows an outline configuration of the projector in the embodiment.

Hereafter, a description will be given, based on the drawings, of one embodiment of the invention.
External Configuration FIGS. 1 and 2 schematically show an outline configuration of a projector 1. Specifically, FIG. 1 is a perspective view of a condition in which a cover 6 is positioned in a closed position, as seen from above, while FIG. 2 is a perspective view of a condition in which the cover 6 is positioned in an open position, as seen from above.

"Upper" and "lower", to be described hereafter, correspond respectively to a top and a bottom as viewed in FIGS. 1 and 2. Also, for the sake of description, hereafter, a projection side will be described as a front (the back in FIGS. 1 and 2), and a side opposite to the projection side as a rear (the near side in FIGS. 1 and 2).

The projector 1 modulates a luminous flux emitted from a light source in accordance with image information, forming an image light, and magnifies and projects the image light formed onto a screen (not shown).

Although a specific description is to be given hereafter, the projector 1 of the embodiment magnifies and projects the image light toward an upper front side from a top surface (which, being a first surface, is an upper portion when the projector 1 is placed on a desk or the like) 2A. Also, when the image light is magnified and projected downward from a ceiling side, the first surface 2A is made a lower surface.

As shown in FIG. 1 or 2, the projector 1 includes an exterior casing 2 configuring the exterior thereof.

The exterior casing 2 houses an apparatus main body of the projector 1. As shown in FIG. 1 or 2, the exterior casing 2, including the top surface 2A positioned on the upper side, a bottom surface 2B which, being positioned on the lower side, faces the top surface 2A, and side surfaces 2C to 2F connecting the top surface 2A and the bottom surface 2B, is formed into an approximately rectangular parallelepiped.

As shown in FIG. 1 or 2, the top surface 2A is formed to be flat.

A cover attachment portion 4 which allows the image light to pass through is formed in a rear side portion of the top surface 2A in an approximate center thereof in a left-right direction.

Also, in the top surface 2A, a transmissive member 5 (FIG. 2), which closes a luminous flux passage opening 421 (FIG. 2) of the cover attachment portion 4 which allows the image light to pass through, is attached to the underside of the cover attachment portion 4.

Furthermore, in the top surface 2A, the cover 6 which, moving in a front-rear direction, is positioned in a closed position in which the transmissive member 5 is covered, and in an open position in which the transmissive member 5 is uncovered, is attached to the cover attachment portion 4.

Detailed configurations of the cover attachment portion 4, transmissive member 5, and cover 6 will be described hereafter.
Internal Configuration FIG. 3 is a perspective view of an optical unit 3 housed inside the exterior casing 2, as seen from the upper front side.

Figure 3:
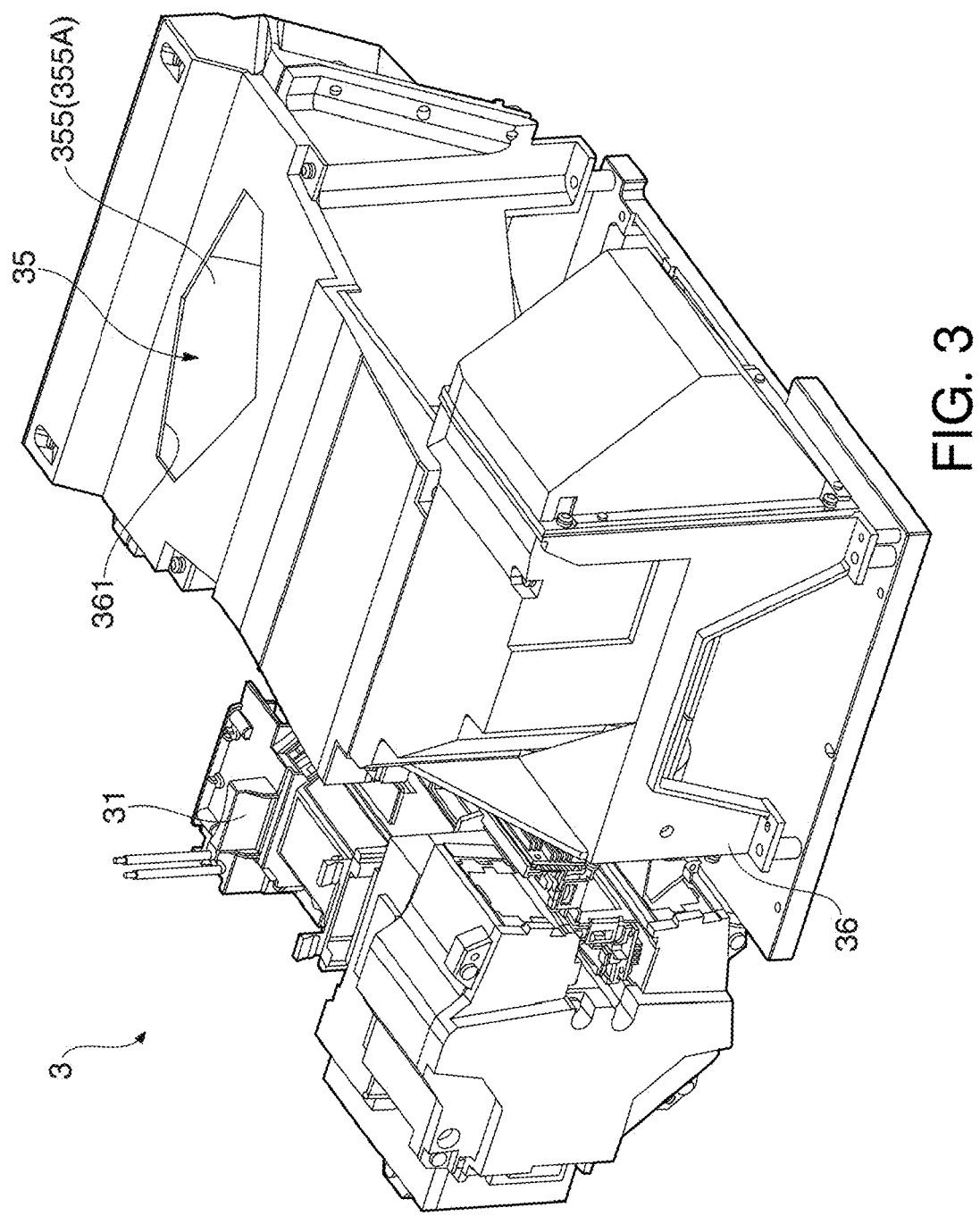
FIG. 3 is a perspective view of an optical unit housed inside an exterior casing in the embodiment, as seen from an upper front side.

The optical unit 3 shown in FIG. 3 is housed inside the exterior casing 2.

Although a specific illustration is omitted, a configuration is such that a cooling unit including a cooling fan or the like which cools the interior of the projector 1, a power source unit supplying power to each component member of the projector 1, a control device controlling an operation of each component member of the projector 1, and the like, are disposed in an internal space of the exterior casing 2 other than that of the optical unit 3.

Figure 4:
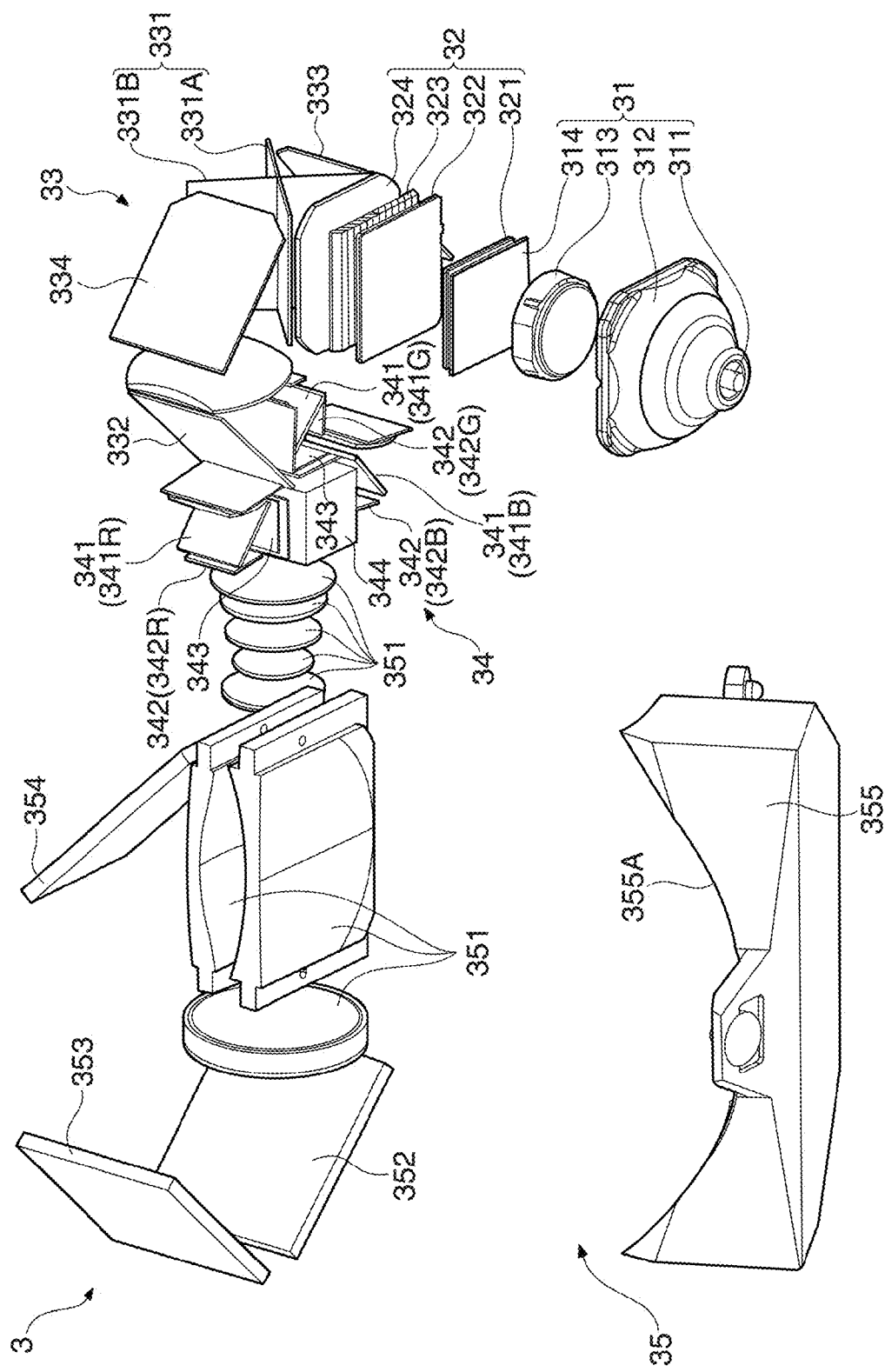
FIG. 4 is a perspective view of an optical system of the optical unit in the embodiment, as seen from a upper rear side.

FIG. 4 is a perspective view of an optical system of the optical unit 3, as seen from the upper rear side.

The optical unit 3, under the control of the control device, optically processes a luminous flux emitted from the light source, forming a color image corresponding to an image signal, and projects it magnified toward the upper front side. As shown in FIG. 4, the optical unit 3 includes a light source device 31, an illumination optical device 32, a color separation optical device 33, an optical device 34, a projection optical device 35, and an optical parts casing 36 (FIG. 3) which houses the members 31 to 35 inside.

As shown in FIG. 4, the light source device 31 includes a light source lamp 311, a reflector 312, a parallelization lens 313, a UV-IR filter 314, and the like. A luminous flux emitted from the light source lamp 311, after being oriented in an exiting direction by the reflector 312, and approximately parallelized by the parallelization lens 313, is emitted via the UV-IR filter 314 toward the illumination optical device 32. The UV-IR filter 314 absorbs or reflects luminous fluxes in the ultraviolet region and infrared region, and transmits other luminous fluxes.

As shown in FIG. 4, the illumination optical device 32 includes a first lens array 321, a second lens array 322, a polarization conversion element 323, a superimposing lens 324, and the like. Then, a luminous flux emitted from the light source device 31 is divided into a plurality of partial luminous fluxes by the first lens array 321, and imaged in the vicinity of the second lens array 322. Each partial luminous flux emitted from the second lens array 322 falls incident in such a way that the central axis (main beam) thereof is perpendicular to the incident side end face of the polarization conversion element 323, and is emitted as approximately one kind of linearly polarized light by the polarization conversion element 323. The plurality of partial luminous fluxes which have been emitted as the linearly polarized lights from the polarization conversion element 323, and have passed through the superimposing lens 324, are superimposed on three reflective liquid crystal panels 342, to be described hereafter, of the optical device 34.

As shown in FIG. 4, the color separation optical device 33 includes a cross dichroic mirror 331, in which a B light reflecting dichroic mirror 331A which reflects a blue light, and a GR light reflecting dichroic mirror 331B which reflects a green light and red light, are disposed in an X-shape, a G light reflecting dichroic mirror 332 which reflects a green light, and two reflecting mirrors 333 and 334. Then, the color separation optical device 33 separates the plurality of partial luminous fluxes emitted from the illumination optical device 32 into color lights of three colors, red, green, and blue.

Specifically, the plurality of partial luminous fluxes emitted from the illumination optical device 32 fall incident on the cross dichroic mirror 331 and, by a blue light component being reflected by the B light reflecting dichroic mirror 331A, and a green light component and red light component being reflected by the GR light reflecting dichroic mirror 331B, are separated into the blue light component, green light component, and red light component.

The blue light isolated by the cross dichroic mirror 331 is reflected by the reflecting mirror 333, and falls incident on a wire grid 341B, to be described hereafter, which configures the optical device 34.

Also, the green light and red light isolated by the cross dichroic mirror 331, after being reflected by the reflecting mirror 334, fall incident on the G light reflecting dichroic mirror 332. The green light, among the green light and red light falling incident on the G light reflecting dichroic mirror 332, is reflected by the G light reflecting dichroic mirror 332, and falls incident on a wire grid 341G, to be described hereafter, which configures the optical device 34. Meanwhile, the red light is transmitted through the G light reflecting dichroic mirror 332, and falls incident on a wire grid 341R, to be described hereafter, which configures the optical device 34.

The optical device 34 modulates the incident luminous fluxes in accordance with the image information, forming an image light (a color image). As shown in FIG. 4, the optical device 34 includes three wire grids 341 (the wire grid on the red light side is indicated by 341R, the wire grid on the green light side by 341G, and the wire grid on the blue light side by 341B), three reflective liquid crystal panels 342 (in the same way as in the wire grids 341, 342R, 342G, and 342B indicate the reflective liquid crystal panels on the respective color light sides) acting as optical modulation devices, three polarizing plates 343, and a cross dichroic prism 344 acting as a color synthesizing optical device.

The three wire grids 341 polarize and separate the incident luminous fluxes by means of diffraction based on a grating structure. Each wire grid 341 is disposed tilted at approximately 45 degrees to the optical axis of the incident luminous flux. Then, each wire grid 341 transmits a linearly polarized light, among the incident luminous fluxes, having a polarization direction approximately identical to the polarization direction in which the luminous flux has been oriented by the polarization conversion element 323, and reflects a linearly polarized light, among the incident luminous fluxes, having a polarization direction perpendicular to the previously described polarization direction, polarizing and separating the incident luminous fluxes.

The three reflective liquid crystal panels 342 are each configured of so-called liquid crystal on silicon (LCOS) in which liquid crystal is formed on a silicon substrate. Each reflective liquid crystal panel 342 is disposed approximately perpendicular to the optical axis of the luminous flux transmitted through each wire grid 341. Then, the reflective liquid crystal panels 342, in accordance with a drive signal from the control device, by the orientation condition of the liquid crystal being controlled, modulate the polarization direction of the polarized luminous fluxes transmitted through the wire grids 341, and reflect them toward the wire grids 341. Among the luminous fluxes modulated, and reflected toward the wire grids 341, by the reflective liquid crystal panels 342, the linearly polarized lights having the polarization direction perpendicular to the polarization direction in which the luminous fluxes have been oriented by the polarization conversion element 323 are reflected by the wire grids 341.

The three polarizing plates 343, being disposed one facing each of the luminous flux incident side end faces of the cross dichroic prism 344, transmit a linearly polarized light having a polarization direction identical to the polarization direction in which the linearly polarized light has been reflected by each wire grid 341. That is, a configuration is employed such that, by using both the wire grids 341 and the polarizing plates 343, even in the event that a polarization component other than a desired linearly polarized light is reflected by the wire grids 341, the polarization component is removed by the polarizing plates 343.

The cross dichroic prism 344 synthesizes the individual color lights falling incident thereon from the corresponding luminous flux incident side end faces, forming a color image. In the cross dichroic prism 344, in which four right angle prisms are bonded together, forming an approximately square shape in a plan view, two dielectric multilayers are formed at the interfaces between the right angle prisms bonded together. The dielectric multilayers transmit the green light which has been reflected by the wire grid 341G and has passed through the polarizing plates 343, and reflect the red and blue lights which have been reflected by the wire grids 341R and 341B and have passed through the polarizing plates 343. In this way, the individual color lights are synthesized, forming a color image.

The projection optical device 35 projects the color image formed by the optical device 34, at a short focal length and at a wide angle, through an opening 361 (FIG. 3) formed in the optical parts casing 36, and the luminous flux passage opening 421 and, as shown in FIG. 4, includes a plurality of lenses 351, three reflecting mirrors 352 to 354, and an aspheric mirror 355.

The aspheric mirror 355 has a reflecting surface 355A which, being formed as a free-form surface, is not of rotational symmetry. Then, the aspheric mirror 355, being disposed at the last stage of the optical path in the projection optical device 35 in such a way that the reflecting surface 355A faces the upper front side, reflects the color image, led from the front side to the rear side by the plurality of lenses 351 and the reflecting mirrors 352 to 354, to the upper front side, and widens the angle thereof.

By employing the heretofore described projection optical device 35, it is possible to dispose the projector 1 in a position close to the screen (not shown), improving a degree of freedom in installation of the projector 1. That is, the projector 1 can be disposed in close contact with a wall surface on which the screen is provided. As it is possible to dispose the projector 1 in close contact with the wall surface, it being possible to reliably avoid a situation in which light traveling in the direction of an observer from the screen is blocked by the projector 1, it is possible to enjoy a pleasant video viewing.

Detailed Configuration of Cover Attachment Portion

Figure 5A:
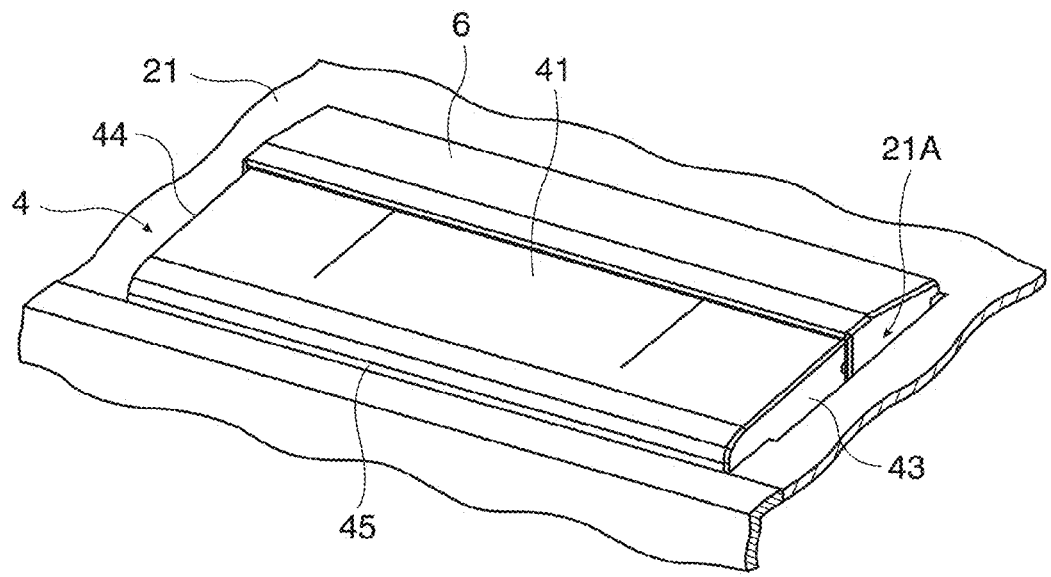
FIGS. 5A and 5B illustrate a configuration of a cover attachment portion in the embodiment.
Figure 5B:
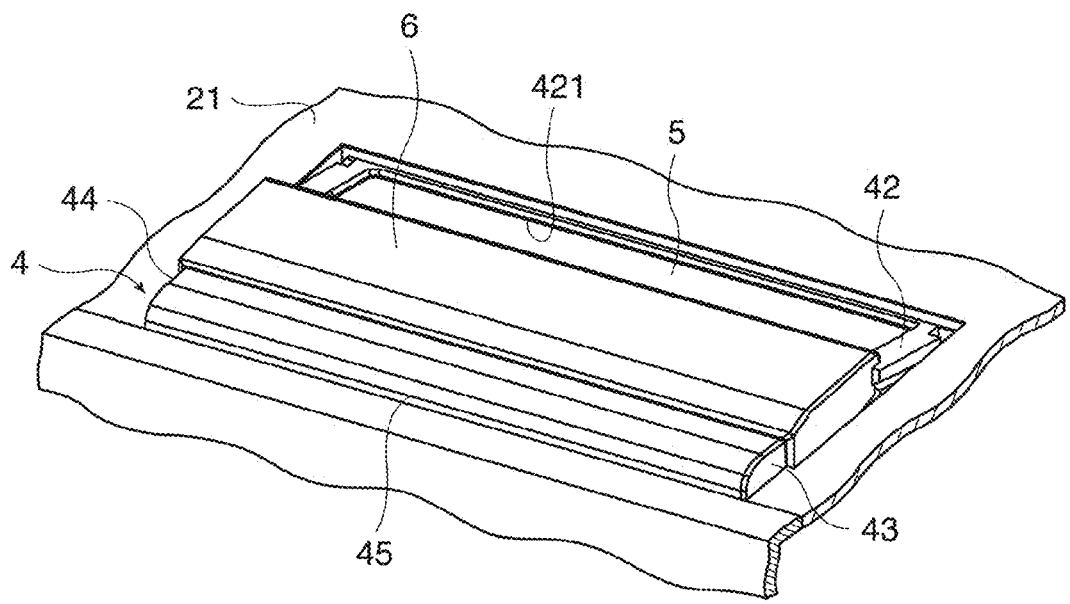
Figure 6A:
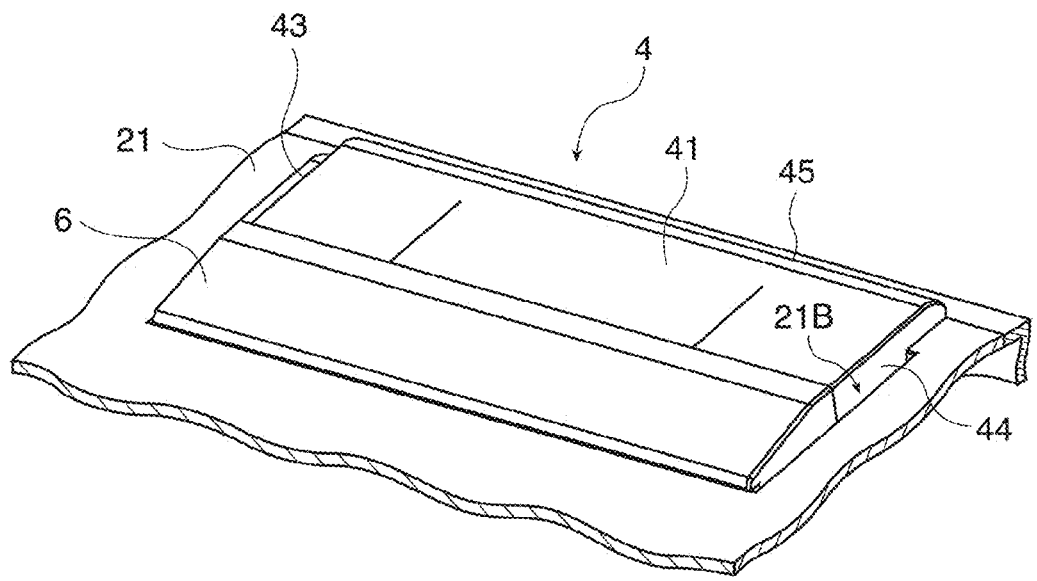
FIGS. 6A and 6B illustrate a configuration of the cover attachment portion in the embodiment.
Figure 6B:
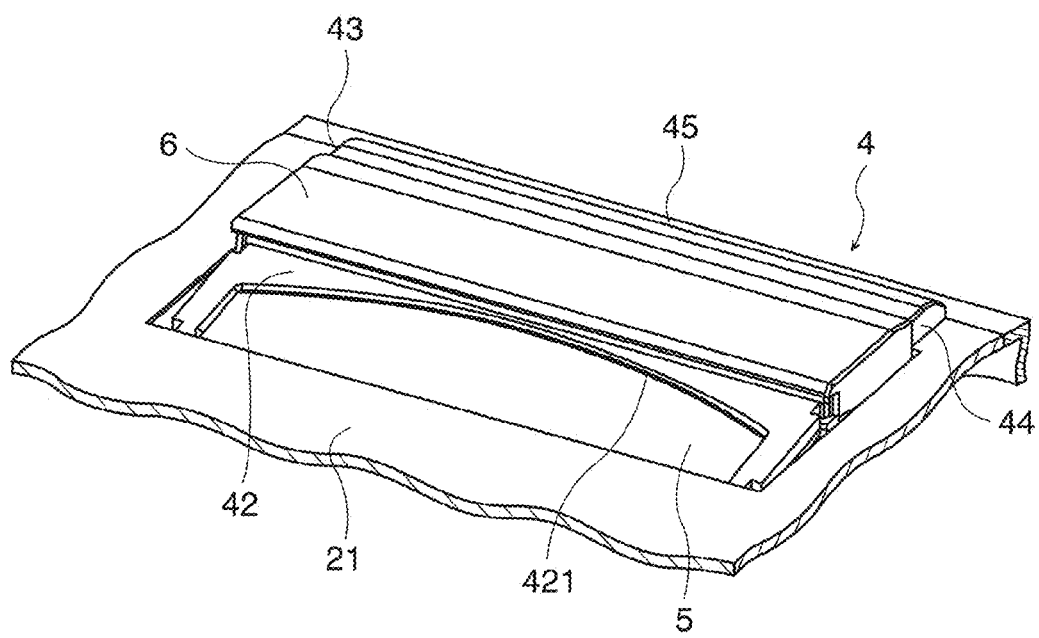

FIGS. 5A to 6B illustrate a configuration of the cover attachment portion 4. Specifically, FIGS. 5A and 5B are perspective views of the cover attachment portion 4, as seen from the rear side, while FIGS. 6A and 6B are perspective views of the cover attachment portion 4, as seen from the front side. FIGS. 5A and 6A show a condition in which the cover 6 is positioned in the closed position, while FIGS. 5B and 6B show a condition in which the cover 6 is positioned in the open position.

Figure 7:
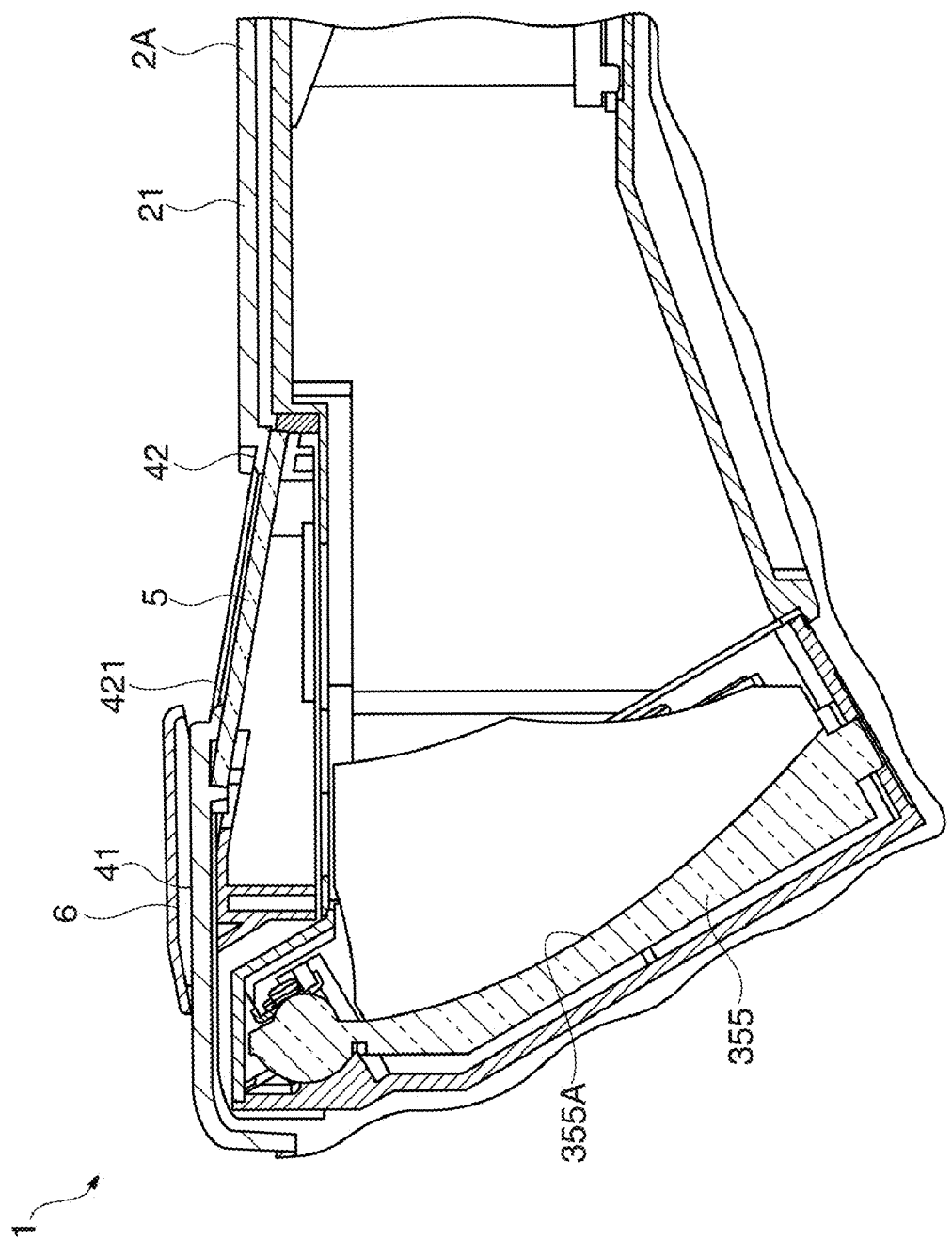
FIG. 7 is a sectional view of a positional relationship between the cover attachment portion and an aspheric mirror in the embodiment, as seen from a side.

FIG. 7 is a sectional view of a positional relationship between the cover attachment portion 4 and the aspheric mirror 355, as seen from a side. FIG. 7 shows a condition in which the cover 6 is opened.

As shown in FIGS. 5A to 7, the cover attachment portion 4 includes a bulging surface portion 41, a tilted surface portion 42, side surface connection portions 43 and 44, and a rear surface connection portion 45.

The bulging surface portion 41, being formed to be flat and parallel to a region 21 of the top surface 2A other than the cover attachment portion 4, has an approximately rectangular plate body form. Then, the bulging surface portion 41 is provided in such a way that the height position thereof is made higher than the other region 21 by the tilted surface portion 42 and the connection portions 43 to 45.

The tilted surface portion 42, being tilted in such a way that the height position thereof decreases toward the front side from the rear side, connects the front end of the bulging surface portion 41 and the other region 21. Also, the tilted surface portion 42, being formed to be flat, has an approximately rectangular plate body form.

The luminous flux passage opening 421 which, penetrating through the tilted surface portion 42 to the other side, allows an image light reflected by the aspheric mirror 355 to pass through is formed in an approximately central portion of the tilted surface portion 42.

The luminous flux passage opening 421 has an approximately rectangular shape and, as shown in FIG. 7, is positioned on the front side of the aspheric mirror 355 disposed inside the exterior casing 2. Then, an end edge of the luminous flux passage opening 421 on the rear side has an arc shape such as to spread out to the rear side in order that the image light reflected by the aspheric mirror 355 does not interfere with the luminous flux passage opening 421 (refer to FIG. 6B).

The side surface connection portions 43 and 44, hanging vertically from ends of the bulging surface portion 41 and tilted surface portion 42 parallel to a front-rear direction (a direction of movement of the cover 6), are connected to the other region 21.

Herein, inwardly depressed grooves 21A and 21B which, being positioned on end sides of the cover attachment portion 4 parallel to a front-rear direction, extend parallel to a front-rear direction are formed in the other region 21 (refer to FIGS. 5A to 6B, 9, and 10).

Then, the side surface connection portions 43 and 44 are connected to the bottom portions of the grooves 21A and 21B respectively. That is, the side surface connection portions 43 and 44 configure the side wall portions of the grooves 21A and 21B respectively.

The heretofore described side surface connection portions 43 and 44 come into engagement with the cover 6.

A structure of engagement of the side surface connection portions 43 and 44 with the cover 6 will be described hereafter.

The rear surface connection portion 45 connects the rear side end of the bulging surface portion 41 and the other region 21.

Detailed Configuration of Transmissive Member

The transmissive member 5 is configured of a material such as glass or the like having transmittivity.

Then, as shown in FIG. 7, the transmissive member 5 is disposed in close contact with the underside of the tilted surface portion 42 in such a way as to close the luminous flux passage opening 421.

That is, the transmissive member 5 is disposed tilted in such a way that the height position thereof decreases toward the front side from the rear side.

Detailed Configuration of Cover

Figure 8:
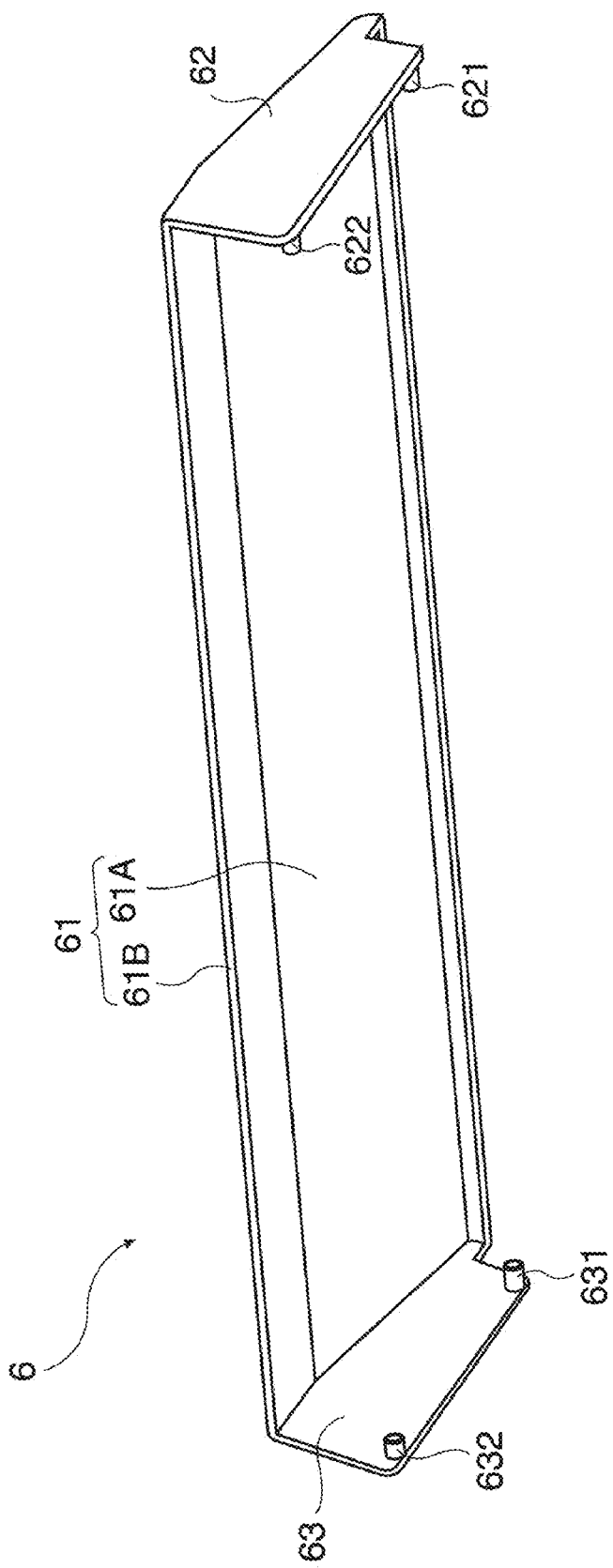
FIG. 8 is a perspective view of a cover in the embodiment, as seen from the lower rear side.

FIG. 8 is a perspective view of the cover 6 as seen from the lower rear side.

The cover 6, when the projector 1 is not used, is moved to the closed position on the front side, and covers the transmissive member 5, closing the luminous flux passage opening 421, as shown in FIG. 5A or 6A. Also, the cover 6, when the projector 1 is used, is moved to the open position on the rear side, and exposes the transmissive member 5, uncovering the luminous flux passage opening 421, as shown in FIGS. 5B and 6B.

As shown in FIG. 8, the cover 6 includes a cover main body 61 and standing pieces 62 and 63.

The cover main body 61 has an approximately rectangular plate body form, the external shape of which is larger than that of the tilted surface portion 42. Then, the cover main body 61 is formed bent in such a way that a front side rectangular region 61A and a rear side rectangular region 61B form a predetermined angle (obtuse angle).

Figure 11A:
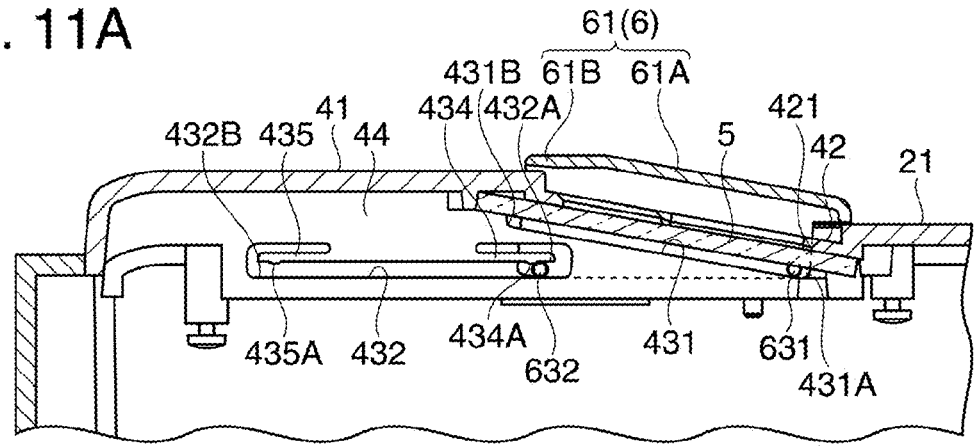
FIGS. 11A to 11C illustrate an operation of the cover in the embodiment.

Specifically, the cover main body 61 is arranged so that, in a condition in which the cover 6 is positioned in the closed position, the rectangular region 61A is parallel to the tilted surface portion 42, while the rectangular region 61B is parallel to the bulging surface portion 41 (refer to FIG. 11A).

The standing pieces 62 and 63, hanging vertically from the ends of the cover main body 61 parallel to a front-rear direction (a direction of movement of the cover 6), have an approximately rectangular shape. Then, in a condition in which the cover 6 is attached to the cover attachment portion 4, the standing pieces 62 and 63, by the leading end portions thereof being inserted in the grooves 21A and 21B, come into abutment with the side surface connection portions 43 and 44.

A pair of first and second engagement pins 621 and 622, and a pair of first and second engagement pins 631 and 632, each protruding from one standing piece toward the other, which come into engagement with the side surface connection portions 43 and 44, are formed on the leading end sides of the opposed inner surfaces of the standing pieces 62 and 63.

Specifically, the first engagement pins 621 and 631 are formed in front side corner portions of the inner surfaces of the standing pieces 62 and 63. Also, the second engagement pins 622 and 632 are formed in rear side corner portions of the inner surfaces of the standing pieces 62 and 63. A distance of the first engagement pins 621 and 631 from a plane passing through the rear side rectangular region 61B of the cover main body 61 is set to be approximately identical to that of the second engagement pins 622 and 632 (refer to FIGS. 11A to 11C). Also, the protruding height dimension of the first engagement pins 621 and 631 is set to be larger than that of the second engagement pins 622 and 632.

Configuration of Engagement of Cover with Cover Attachment Portion

Figure 9:
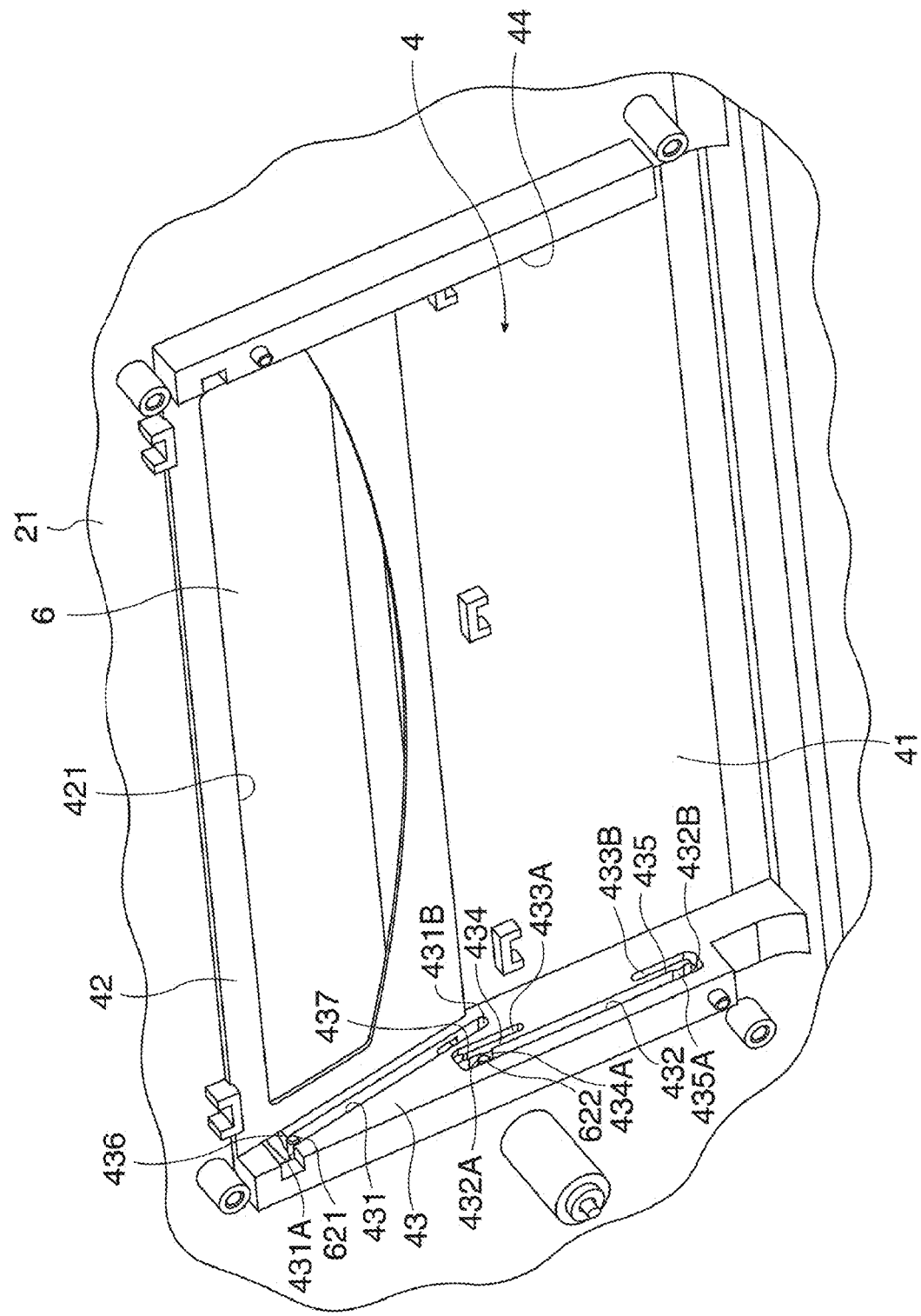
FIG. 9 shows a structure of engagement of the cover with the cover attachment portion in the embodiment.
Figure 10:
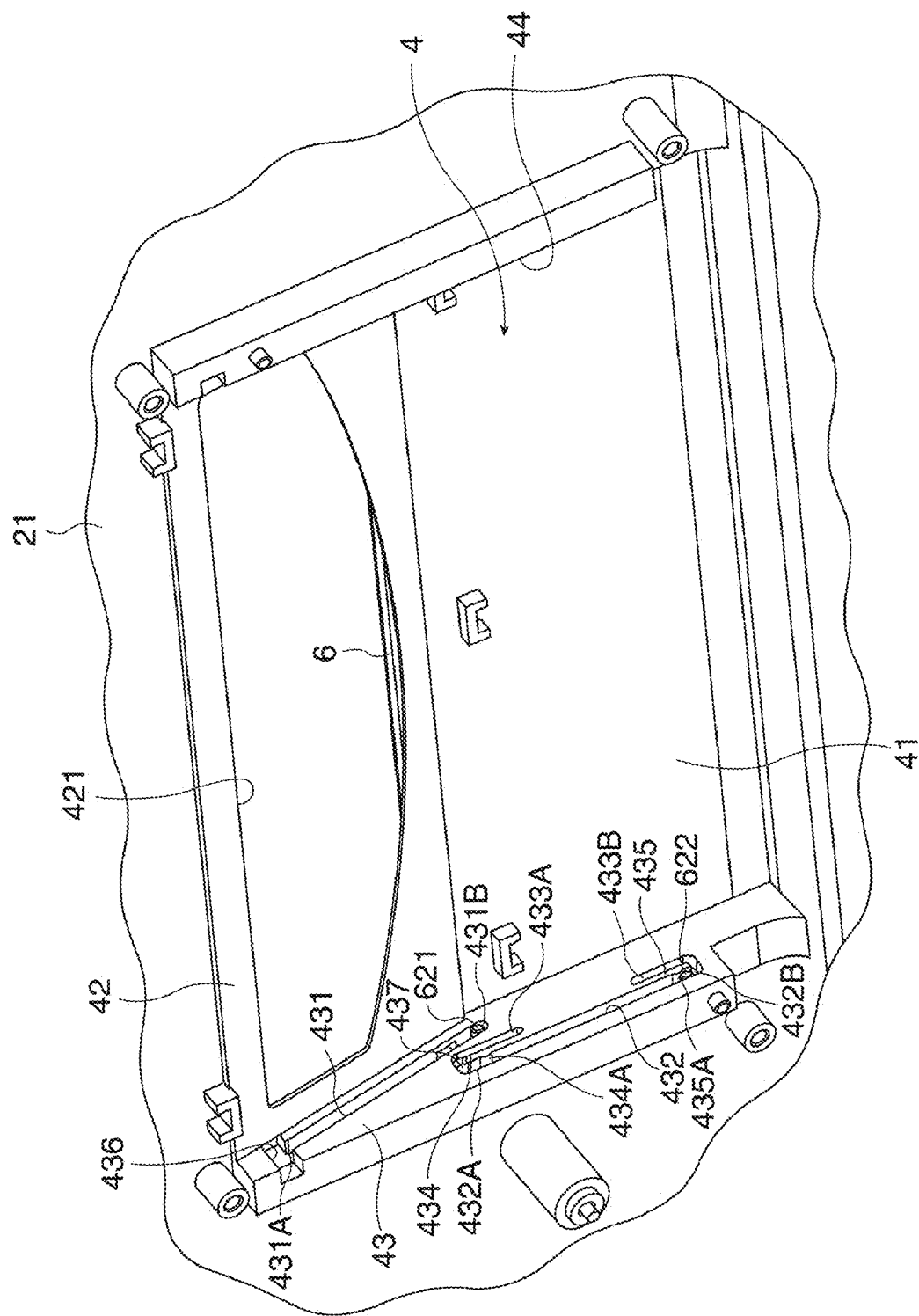
FIG. 10 shows a structure of engagement of the cover with the cover attachment portion in the embodiment.

FIGS. 9 and 10 show a structure of engagement of the cover 6 with the cover attachment portion 4. Specifically, FIG. 9 is a perspective view of a condition in which the cover 6 is positioned in the closed position, as seen from the lower front side, while FIG. 10 is a perspective view of a condition in which the cover 6 is positioned in the open position, as seen from the lower front side.

Detailed structures of the side surface connection portions 43 and 44 will be described hereafter but, as the side surface connection portions 43 and 44 have the same structure, only the structure of the side surface connection portion 43 will be described and, with respect to the side surface connection portion 44, identical reference characters being given to components identical to those of the side surface connection portion 43, a description will be omitted.

As shown in FIGS. 9 and 10, a first slot 431 and second slot 432 which, having the first engagement pin 621 and the second engagement pin 622 respectively inserted therein, guide a movement of the cover 6 are formed in the side surface connection portion 43.

The first slot 431, communicating with the interior of the exterior casing 2, is formed in a linear shape extending in a front-rear direction and parallel to the tilted surface portion 42. That is, the first slot 431 is set so that the height position of a front side end 431A is lower than that of a rear side end 431B.

The second slot 432, communicating with the interior of the exterior casing 2, is formed in a linear shape extending in a front-rear direction and parallel to the bulging surface portion 41. That is, the second slot 432 is set so that the height position of a front side end 432A is identical to that of a rear side end 432B.

Also, the height position of the end 431A of the first slot 431 is set to be identical to those of the ends 432A and 432B of the second slot 432.

Also, biasing apertures 433A and 433B which communicate with the interior of the exterior casing 2 and, as well as extending parallel to the second slot 432, communicate with the respective ends 432A and 432B, as shown in FIGS. 9 and 10, are formed in portions of the side surface connection portion 43 above the ends 432A and 432B of the second slot 432.

Then, regions 434 and 435 sandwiched between the second slot 432 and the biasing apertures 433A and 433B have a predetermined amount of elasticity which allows the proximal end portions thereof to bend.

Also, regulation protrusions 434A and 435A which, bulging into the second slot 432, interfere mechanically with the second engagement pin 632 when the second engagement pin 632 is moved are formed on the lower side of the leading end portions of the respective regions 434 and 435.

Furthermore, as shown in FIGS. 9 and 10, a first attachment aperture 436 which extends from an upper end portion of the side surface connection portion 43 downward and, as well as communicating with the interior of the exterior casing 2, communicates with the end 431A of the first slot 431 is formed in the side surface connection portion 43.

Also, as shown in FIGS. 9 and 10, a second attachment aperture 437 which extends from an upper end portion of the side surface connection portion 43 downward and, as well as communicating with the first slot 431, communicates with the end 432A of the second slot 432 is formed in the side surface connection portion 43.

That is, when attaching the cover 6 to the cover attachment portion 4, by fitting the first engagement pin 631 and the second engagement pin 632 respectively into the first attachment aperture 436 and the second attachment aperture 437, and moving the cover 6 downward, it is possible to insert the first engagement pin 631 in the first slot 431, and insert the second engagement pin 632 in the second slot 432.

Herein, the second attachment aperture 437 having a groove shape such that a portion of the side surface connection portion 43 on the groove 21A side is notched, the depth dimension thereof is set to be approximately identical to the protruding height dimension of the second engagement pin 632. Then, as the protruding height dimension of the first engagement pin 631 is set to be larger than that of the second engagement pin 632, as heretofore described, it does not happen that the first engagement pin 631 escapes upward via the second attachment aperture 437, causing the cover 6 to come off when the cover 6 moves.

Operation of Cover

Figure 11B:
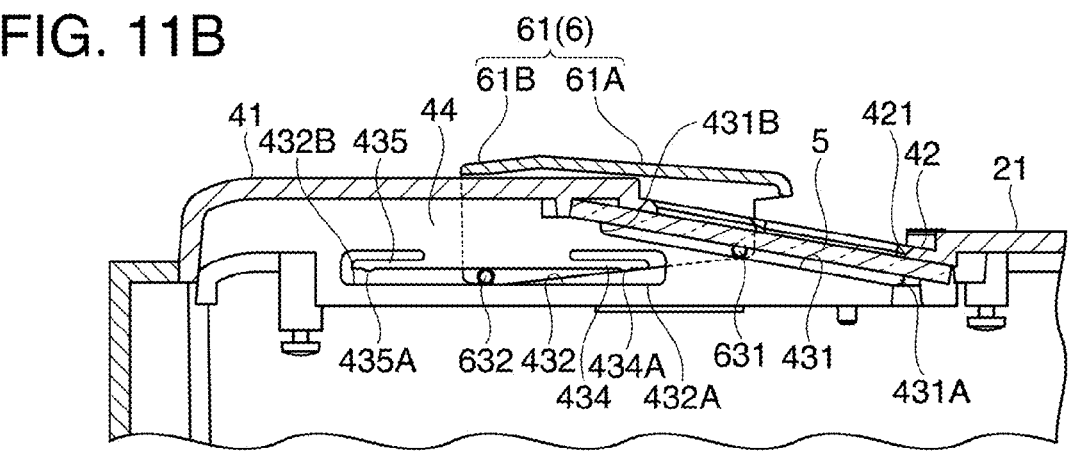
Figure 11C:
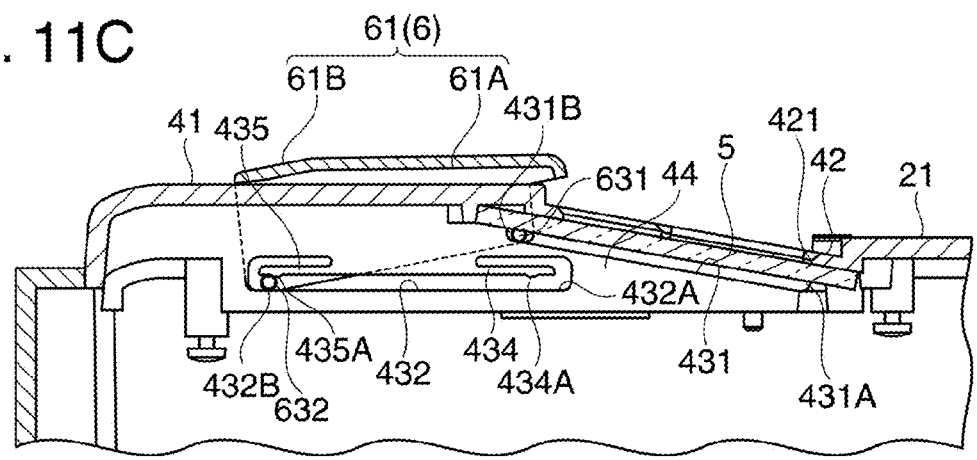

FIGS. 11A to 11C illustrate an operation of the cover 6. Specifically, FIGS. 11A to 11C are sectional views of an operation when the cover 6 moves from the closed position (FIG. 11A) to the open position (FIG. 11C), as seen from a side.

Next, a description will be given of an operation from the condition in which the cover 6 is positioned in the closed position until it is positioned in the open position.

In the condition in which the cover 6 is positioned in the closed position, as shown in FIG. 11A, the first engagement pin 631 and the second engagement pin 632 are positioned at the end 431A of the first slot 431 and at the end 432A of the second slot 432 respectively.

Herein, the second engagement pin 632 is in a condition in which it is in abutment with the front side of the regulation protrusion 434A of the region 434, and biased to the front side by the elasticity of the region 434. Consequently, the cover 6 is in a condition in which a movement thereof to the rear side is regulated by the region 434.

That is, the region 434 functions as a first biasing portion according to some aspects of the invention which, when the second engagement pin 632 is positioned at the end 432A, biases the second engagement pin 632 to the front side, regulating a movement of the second engagement pin 632 to the front side.

On a predetermined amount of force being applied rearward to the cover 6 against the biasing force of the first biasing portion 434, the regulation protrusion 434A is pressed by the second engagement pin 632, pulling the leading end of the first biasing portion 434 upward. Then, on the second engagement pin 632 being positioned on the rear side of the regulation protrusion 434A, the biasing of the first biasing portion 434 is released.

Herein, as shown in FIG. 11B, by the first engagement pin 631 being guided along the first slot 431, the cover 6, while the front side thereof is being gradually pulled upward, moves to the rear side.

Then, when the cover 6 moves to the rear side, and is positioned in the open position shown in FIG. 11C, that is, when the first engagement pin 631 and the second engagement pin 632 are positioned at the end 431B of the first slot 431 and at the end 432B of the second slot 432 respectively, in the same way as heretofore described, the regulation protrusion 435A is pressed by the second engagement pin 632, pulling the region 435 upward. Then, on the second engagement pin 632 being positioned on the rear side of the regulation protrusion 435A, the second engagement pin 632 attains a condition in which it is biased to the rear side via the regulation protrusion 435A by the elastic force of the region 435. Consequently, the cover 6 attains a condition in which a movement thereof to the front side is regulated by the region 435.

That is, the region 435 functions as a second biasing portion according to some aspects of the invention which, when the second engagement pin 632 is positioned at the end 432B, biases the second engagement pin 632 to the rear side, regulating a movement of the second engagement pin 632 to the front side.

Heretofore, a description has been given of an operation until the cover 6 is positioned in the open position from the closed position, but an operation until it is positioned in the closed position from the open position is implemented in reverse order to the heretofore described operation.

In the heretofore described embodiment, there are the following advantages.

With the embodiment, as the transmissive member 5 is attached to the top surface 2A of the exterior casing 2, it is possible to close the luminous flux passage opening 421 by means of the transmissive member 5 while allowing the image light reflected by the aspheric mirror 355 to pass through the luminous flux passage opening 421. For this reason, it being possible to avoid dust adhesion to, contamination of, or an impact on, the aspheric mirror 355, it is possible to efficiently maintain a projection image in a clear condition.

Also, as the cover 6 is attached to the top surface 2A, by positioning the cover 6 in the open position, it is possible to cover the transmissive member 5 with the cover 6 when the projector 1 is not used. That is, as it is possible to avoid dust adhesion to, contamination of, or an impact on, the transmissive member 5 by means of the cover 6, it is possible to protect the aspheric mirror 355 by means of the transmissive member 5, as well as efficiently maintaining a projection image in a clear condition.

Also, as the transmissive member 5 is disposed tilted in the way heretofore described, it being possible to reduce the angle of incidence of an image light onto the transmissive member 5 in comparison with a case in which the transmissive member 5 is disposed in such a way as to be parallel to the horizontal, it is possible to suppress an effect of refraction in the transmissive member 5. For this reason, it is possible to suppress a projection image distortion and an image degradation, efficiently maintaining a projection image in a clear condition.

Furthermore, the tilted surface portion 42 configuring the cover attachment portion 4, as well as being tilted in the way heretofore described, has the luminous flux passage opening 421 formed therein. By this means, simply by bringing the transmissive member 5 into abutment with the tilted surface portion 42, it is possible to dispose the transmissive member 5 tilted, facilitating the installation of the transmissive member 5.

Also, as the luminous flux passage opening 421 is formed in the tilted surface portion 42, the opening face is tilted from the horizontal in such a way as to face the reflecting surface 355A of the aspheric mirror 355. For this reason, it is possible to increase an apparent opening area of the luminous flux passage opening 421 when seen from the aspheric mirror 355 side, in comparison with a case in which the luminous flux passage opening 421 is formed in such a way as to be parallel to the horizontal. Consequently, it not being necessary to form the luminous flux passage opening 421 to be larger than necessary in order to allow the image light reflected by the aspheric mirror 355 to pass therethrough, it is possible to make the external appearance of the projector 1 pleasing.

Furthermore, as the side surface connection portions 43 and 44 coming into engagement with the cover 6 are formed in such a way as to hang vertically from the ends of the bulging surface portion 41 and tilted surface portion 42 parallel to a front-rear direction, it is possible to position the side surface connection portions 43 and 44 on the lower side of the opening face of the luminous flux passage opening 421. For this reason, it being possible to prevent the image light reflected by the aspheric mirror 355 and projected via the luminous flux passage opening 421 from being blocked by the side surface connection portions 43 and 44, it is possible to efficiently maintain a projection image.

Furthermore, the first slot 431 coming into engagement with the first engagement pins 621 and 631 is set so that the height position of the front side end 431A is lower than that of the rear side end 431B. By this means, when the cover 6 moves to the open position from the closed position, the first engagement pins 621 and 631 are guided by the first slot 431, and the cover 6 moves while the front side end thereof is being gradually pulled upward. For this reason, when the cover 6 moves, the front side end thereof is prevented from interfering mechanically with the bulging surface portion 41, enabling an efficient movement of the cover 6 with a simple configuration.

Also, the second slot 432 coming into engagement with the second engagement pins 622 and 632 is set so that the front side and rear side ends 432A and 432B are identical in height position. By this means, it is possible to set the height position of the rear side end of the cover 6 in the condition in which the cover 6 is positioned in the closed position to be identical to that of the cover 6 in the condition in which it is positioned in the open position. For this reason, for example, in the event of designing in such a way that a clearance between the rear side end of the cover 6 and the bulging surface portion 41 is minimized in the condition in which the cover 6 is positioned in the closed position, it is also possible, in the condition in which the cover 6 is positioned in the open position, to minimize the clearance between the rear side end of the cover 6 and the bulging surface portion 41. Consequently, as the clearance between the rear side end of the cover 6 and the bulging surface portion 41 is minimized when the projector 1 is used and when it is not used, it is possible to make the external appearance of the projector 1 pleasing.

Furthermore, as the first slot 431 is formed in a linear shape parallel to the tilted surface portion 42, and the second slot 432 is formed in a linear shape parallel to the bulging surface portion 41, it is possible to set the height position of the rear side end of the cover 6 to be always constant when the cover 6 moves. For this reason, it being possible, not only when the projector 1 is used and when it is not used, but also in a condition in which the cover 6 is positioned between the closed position and the open position, to minimize the clearance between the rear side end of the cover 6 and the bulging surface portion 41, it is possible to make the external appearance of the projector 1 more pleasing.

Also, as the first biasing portion 434 and the second biasing portion 435 are formed in the side surface portions 43 and 44, it is possible to prevent the cover 6 from moving by itself.

Furthermore, as a configuration is employed such that the second engagement pin 632 is biased by the mechanical interference of the second engagement pin 632 with the regulation protrusions 434A and 435A formed on the respective biasing portions 434 and 435, it is possible, when the cover 6 is moved to the closed position or the open position, to minimally vibrate the cover 6 by means of the biasing portions 434 and 435. That is, it being possible to make a user aware of a condition of movement of the cover 6, it is possible to reliably move the cover 6 to the closed position or the open position. Consequently, it is possible to improve the usability of the projector 1.

Also, as the biasing portions 434 and 435 are configured of regions sandwiched between the second slot 432 and the biasing apertures 433A and 433B, it not being necessary to provide a member separately, it is possible to make a simple structure.

Furthermore, as the side surface connection portions 43 and 44 configure the side wall portions of the grooves 21A and 21B formed in the top surface 2A, it is possible to realize a structure in which the cover 6 comes into engagement with the side surface connection portions 43 and 44 in a condition in which the leading end portions of the standing pieces 62 and 63 of the cover 6 are inserted in the grooves 21A and 21B. That is, it being possible to attain a condition in which the engagement pins 621, 622, 631, and 632, and the slots 431 and 432, are invisible from the exterior, it is possible to improve the external appearance of the projector 1.

Also, the cover main body 61 configuring the cover 6 is formed bent in such a way as to follow the bulging surface portion 41 and the tilted surface portion 42. By this means, when the cover 6 moves, the underside of the cover 6 is prevented from interfering mechanically with the bulging surface portion 41, enabling an efficient movement of the cover 6.

Furthermore, in the event that, in the condition in which the cover 6 is positioned in the closed position, the front side rectangular region 61A is formed in such a way as to be parallel to the tilted surface portion 42, while the rear side rectangular region 61B is formed in such a way as to be parallel to the bulging surface portion 41, as the cover 6 attains a shape following the shape of the cover attachment portion 4 when the projector 1 is not used, it is possible to improve the external appearance of the projector 1.

Also, by forming in the way heretofore described, as well as setting in such a way that a straight line passing through the end 431B of the first slot 431 and the end 432B of the second slot 432 has a symmetrical relationship with the first slot 431 with respect to a vertical line, it is possible to set a condition in which the front side rectangular region 61A is made parallel to the bulging surface portion 41. For this reason, it is possible, when the projector 1 is used too, to improve the external appearance of the projector 1. Furthermore, at this time, the rear side rectangular region 61B attains a condition in which it is tilted from the bulging surface portion 41 and, by eliminating a step between the cover main body 61 and the bulging surface portion 41, it is possible to further improve the external appearance of the projector 1.

The invention not being limited to the previously described embodiment, a modification, an improvement, and the like, made without departing from the scope of the invention are incorporated in the invention.

In the embodiment, a description has been given of an example in which the projector 1 is used installed on an installation surface of a desk or the like, but it is also acceptable that the projector 1 is used installed in a condition in which it is hung from a ceiling or the like (the top surface 2A which is a first surface is positioned facing down). In the case in which the projector 1 is used in the condition in which it is hung from a ceiling or the like, all the relative height positions are inverted.

In the embodiment, a configuration has been employed such that the cover 6 is manually moved but, without being limited to this, it is also acceptable to employ, for example, a configuration wherein a motor or the like is used to move the cover 6 not manually but automatically, when turning on power, using a remote control.

In the embodiment, the slots 431 and 432 are formed in a linear shape but, without being limited to this, it is also acceptable that they are formed in an arc shape.

In the embodiment, a configuration has been employed such that the biasing portions 434 and 435, being provided only on the second slot 432 side, bias the second engagement pins 622 and 632 but, without being limited to this, it is also acceptable to employ a configuration wherein the biasing portions 434 and 435, being provided only on the first slot 431 side, bias the first engagement pins 621 and 631, and it is also acceptable to employ a configuration wherein the biasing portions 434 and 435, being provided on both the slot 431 and 432 sides, bias both pairs of first engagement pins 621 and 631, and second engagement pins 622 and 632.

In the embodiment, the cover 6 has been in engagement with the cover attachment portion 4 on the inner surface sides of the standing pieces 62 and 63 but, without being limited to this, it is also acceptable to employ a configuration wherein the cover 6 comes into engagement with the cover attachment portion 4 (the grooves 21A and 21B) on the outer surface sides of the standing pieces 62 and 63.

In the embodiment, the side surface connection portions 43 and 44 have configured the side wall portions of the grooves 21A and 21B but, without being limited to this, it is also acceptable to employ a configuration wherein, the grooves 21A and 21B being omitted, the side surface connection portions 43 and 44 are connected directly to the other region 21.

In the embodiment, the cover main body 61 is formed bent, but it is also acceptable to form it into a flat plate.

In the embodiment, a configuration of the projector 1 is not limited to the configurations described in the previously described embodiment.

For example, the light source device 31 has been configured of a discharge optical emission type light source device but, without being limited to this, it is also acceptable to employ any kind of solid state light emitting element, such as a laser diode, a light emitting diode (LED), an organic electroluminescence (EL) element, or a silicon light emitting element.

Also, the reflective liquid crystal panel 342 has been employed as an optical modulation device but, without being limited to this, it is also acceptable to use an optical modulation device other than liquid crystal, such as a transmissive liquid crystal panel, or a device using a micromirror.

Furthermore, the number of optical modulation devices not being limited to three, it is also acceptable that it is one, two, or four or more.

The projector according to some aspects of the invention, as it enables a projection image to be efficiently maintained in a clear condition, can be applied to a projector used in a presentation, a home theater, or the like.

What is claimed is:

1. A projector comprising:
   a light source device;
   an optical modulation device which modulates a luminous flux emitted from the light source device in accordance with image information, forming an image light;
   a projection optical device which magnifies and projects the image light; and
   an exterior casing which configures an exterior, wherein
     a luminous flux passage opening for allowing the image light projected magnified from the projection optical device to pass through is formed in a first surface of the exterior casing,
     the projection optical device includes an aspheric mirror which reflects the image light to the first surface side, and magnifies and projects the image light via the luminous flux passage opening,
     the exterior casing is provided with:
       a transmissive member which closes the luminous flux passage opening, the transmissive member being disposed tilted upward from an image light projection side toward a side opposite to the projection side; and
       a cover which, being movably attached to the first surface, moves between a closed position in which the transmissive member is covered and an open position in which the transmissive member is exposed,
     a cover attachment portion to which the cover is attached is provided on the first surface
     the cover attachment portion includes:
       a bulging surface portion which protrudes above a region of the first surface other than the cover attachment portion;
       a tilted surface portion which, being tilted upward from the projection side toward the side opposite to the projection side, connects an end of the bulging surface portion on the image light projection side and the other region; and
       connection portions which, standing from ends of the bulging surface portion and tilted surface portion parallel to a direction in which the image light is projected, are connected to the other region,
     the luminous flux passage opening is formed in the tilted surface portion, and
     the cover, being movably attached to the connection portions, is positioned in the closed position by moving to the projection side, and positioned in the open position by moving to the side opposite to the projection side.

2. The projector according to claim 1, wherein
   the cover includes:
     a plate-like cover main body; and
     standing pieces which, standing from ends of the cover main body parallel to the direction in which the image light is projected, come into abutment with the connection portions, and
   wherein
     a first engagement pin and second engagement pin which protrude toward the connection portions are formed on the standing pieces, in this order from the projection side, and
     a first slot and second slot which, having the respective engagement pins inserted therein, guide a movement of the respective engagement pins are formed in the connection portions, wherein
     the first slot is tilted upward from an end thereof on the projection side toward an end thereof on the side opposite to the projection side, and
     the second slot is set so that the whole extent from an end thereof on the projection side to an end thereof on the side opposite to the projection side is parallel to the first surface.

3. The projector according to claim 2, wherein
   the bulging surface portion and the tilted surface portion are formed to be flat, and
   the first slot is formed in a linear shape parallel to the tilted surface portion, while
   the second slot is formed in a linear shape parallel to the bulging surface portion.

4. The projector according to claim 2, wherein
   the connection portions are each provided with:
     a first biasing portion which, when at least one of the two engagement pins is positioned at the end of the slot on the projection side, biases the one engagement pin to the projection side, regulating a movement of the one engagement pin to the side opposite to the projection side; and
     a second biasing portion which, when the one engagement pin is positioned at the end of the slot on the side opposite to the projection side, biases the one engagement pin to the side opposite to the projection side, regulating a movement of the one engagement pin to the projection side.

5. The projector according to claim 1, wherein
   grooves extending parallel to the direction in which the image light is projected are formed in the first surface, and
   the connection portions configure side wall portions of the grooves.

6. The projector according to claim 1, wherein
   the cover main body is formed bent in such a way as to follow the bulging surface portion and the tilted surface portion.

* * * * *